Figure 1:
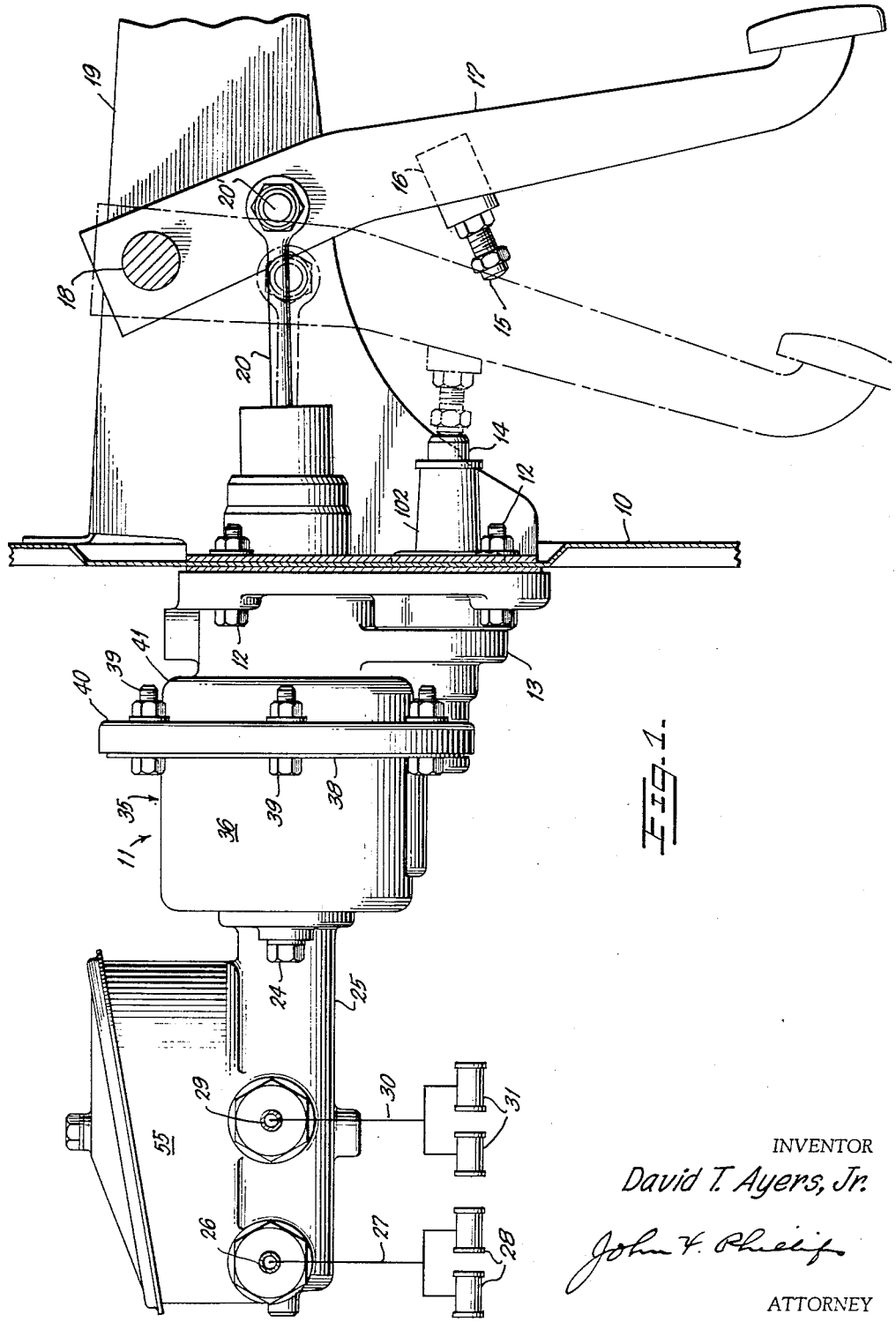

Feb. 4, 1964     D. T. AYERS, JR     3,120,155
VEHICLE BRAKE MECHANISM WITH PEDAL LEVERAGE CHANGING MEANS
Filed March 21, 1962     3 Sheets-Sheet 1

INVENTOR
David T. Ayers, Jr.
ATTORNEY

INVENTOR
David T. Ayers, Jr.
BY John P. Phillips
ATTORNEY ously of the motor and of the pedal push rod.

3,120,155
VEHICLE BRAKE MECHANISM WITH PEDAL LEVERAGE CHANGING MEANS
David T. Ayers, Jr., Birmingham, Mich., assignor to Kelsey-Hayes Company, Romulus, Mich., a corporation of Delaware
Filed Mar. 21, 1962, Ser. No. 181,409
15 Claims. (Cl. 91—391)

This invention relates to a fluid pressure motor mechanism, and particularly to such a mechanism adapted for operating the brakes of motor vehicles, and is an improvement over the structure shown in the copending application of Edward Govan Hill, Serial No. 157,971, filed December 8, 1961, now Patent No. 3,063,427.

As distinguished from conventional booster brake mechanisms, there have been developed recently brake-applying motors of the full power type wherein the operator is required to move the brake pedal only a sufficient distance to operate the valve mechanism of the brake-applying motor for a full brake application. Brake pedals in such systems are arranged approximately at the same height as pedals used for booster motors to allow the operator to move the pedal a sufficient distance for the pedal application of the brakes in the event of a power failure in the motor. Under such conditions of course the operator is forced to use substantial pedal pressure in order to stop the vehicle.

In the copending application referred to above there is disclosed a motor mechanism in which, upon a failure of power in the brake-applying motor, the pedal is swung automatically to a higher position and has an effective lever ratio comparable to conventional brake pedals, whereby the operator may more effectively apply the brakes by pedal pressure. A lower pedal thus may be employed for the power operation of the brakes, thus making it easier for the operator to transfer his foot from the accelerator pedal to the brake pedal, if the operator brakes with his right foot.

In the copending application referred to there is shown a mechanism associated with the brake pedal and including a spring normally compressed when motor-operating pressure is available and which is released upon a power failure to move the pedal to a substantially higher position for the pedal operation of the brakes. Such mechanism may include cam means by which the released spring effects its operation.

An important object of the present invention is to provide an improved mechanism wherein the means for controlling the position of the brake pedal for pedal or power operation of the brakes is associated with and housed for the most part in the brake-applying motor, the forces for changing the pedal position being delivered much more freely, coaxially of the motor and of the pedal push rod.

A further object is to provide a normally compressed spring within the motor, releasable for effecting movement of the pedal to a higher position, and to provide novel means whereby pressure in the source maintains the spring under compression whereby the pedal occupies a lower valve operating position to control the power actuation of the brakes.

A further object is to provide such a mechanism wherein the releasing of the spring, upon a failure of pressure in the source, swings the pedal to a higher position and mechanically locks the pedal relative to the piston of the brake-applying motor, thus providing for the positive actuation of the master cylinder by pedal pressure in the event of a power failure.

A further object is to provide such a mechanism wherein the brake pedal is wholly free of any mechanism for changing its position and wherein it is wholly unnecessary to change any lever fulcrum points for the pedal operation of the brakes if the power should fail.

Other objects and advantages of the invention will become apparent during the course of the following description.

In the drawings I have shown one embodiment of the invention. In this showing

Figure 2:
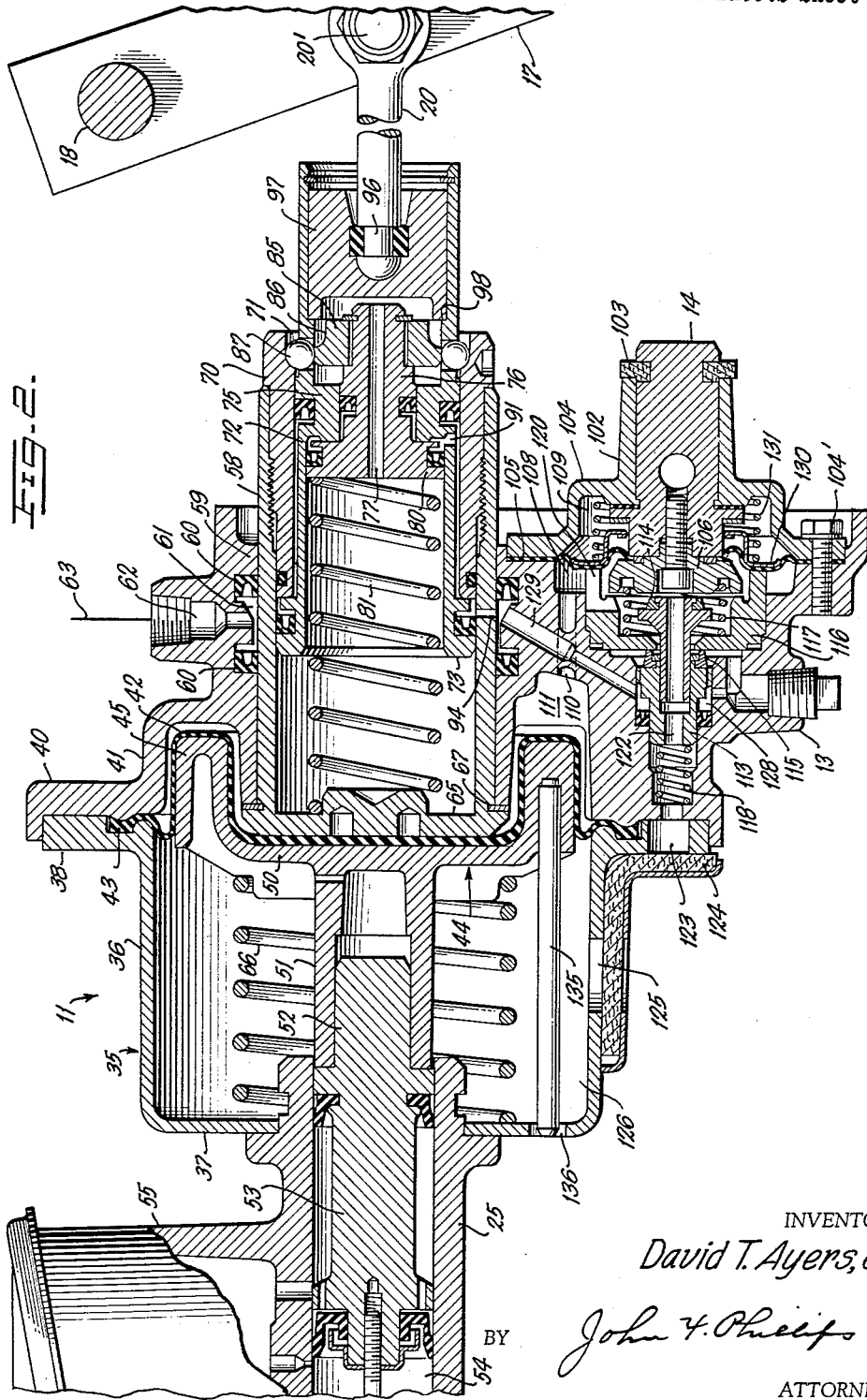
Figure 3:
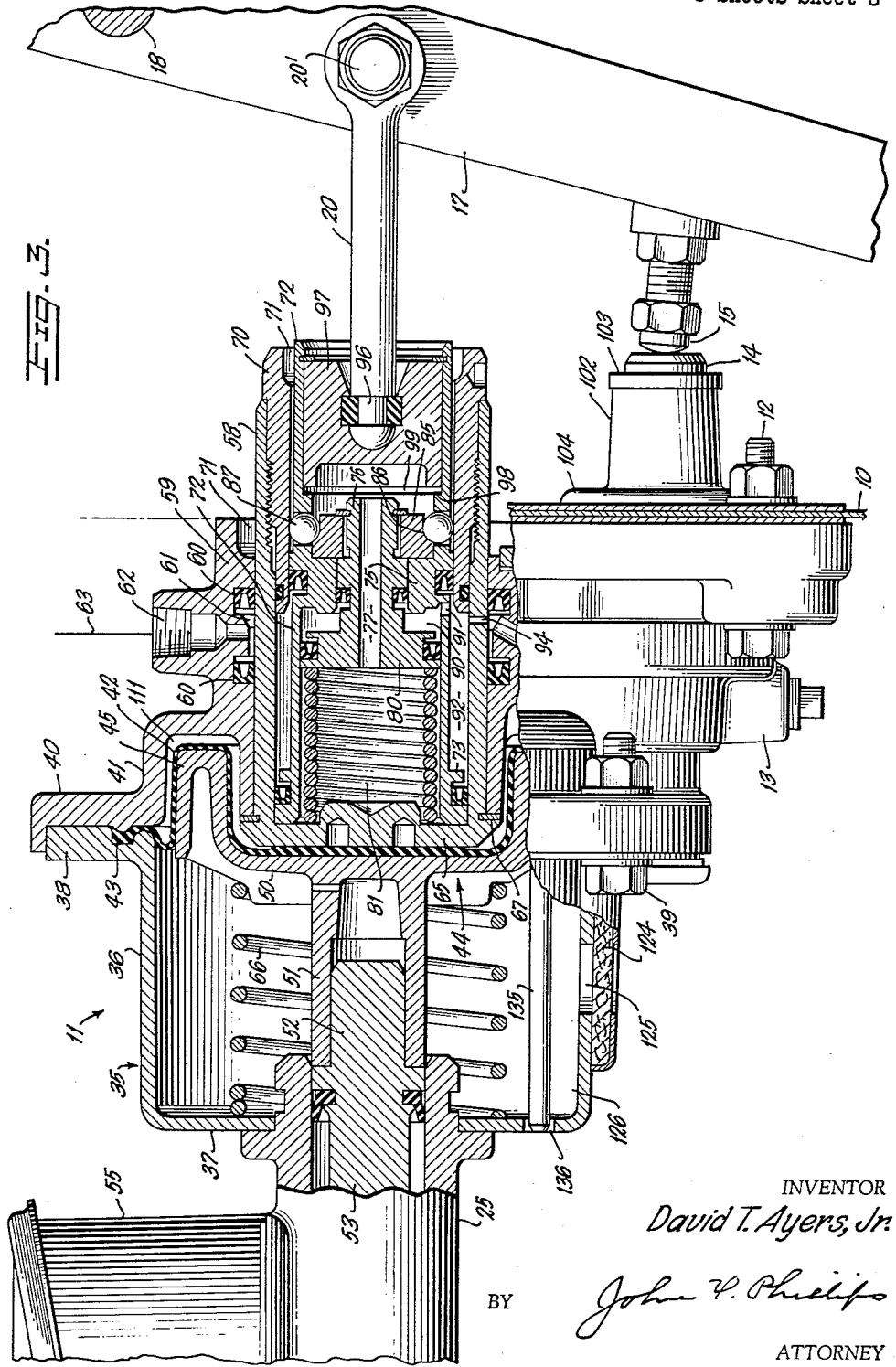

FIGURE 1 is a side elevation of the mechanism, the pedal being shown in solid lines in its higher position and in broken lines in its lower normal power-operating position;

FIGURE 2 is an enlarged axial sectional view through the motor and associated elements, parts being broken away, the motor and valve elements being shown in normal positions for the pedal operation of the brakes, and FIGURE 3 is a similar view, parts being shown in elevation, showing the motor parts and the elements of the present invention in normal positions for the power operation of the brakes.

Referring to FIGURE 1, the numeral 10 designates the fire wall of a motor vehicle to which the present mechanism, indicated as a whole by the numeral 11, is attached by bolts 12. The motor of the mechanism 11 is controlled by a valve mechanism described in detail below housed in a casing 13 and provided with an operating element 14 engageable by the end of an adjustable screw 15 carried by a boss 16 secured to a brake pedal 17. The brake pedal is provided with the usual pedal pad and is pivoted as at 18 adjacent its upper end to a suitable bracket 19 fixed to the fire wall 10. Pivoted to the pedal lever 17 as at 20′ is a rearwardly extending push rod 20 operable as described below for the pedal actuation of the brakes when no pressure is available in the source, the push rod 20 moving idly during the normal power operation of the brakes as described below.

Secured to the forward end of the mechanism 11 by suitable bolts 24 is a master cylinder 25 preferably of the dual chamber type (not shown) the forward chamber of which is provided with an outlet pipe 26 connected by lines 17 to the front wheel brake cylinders 28. The rear chamber of the master cylinder is provided with an outlet pipe 29 connected by lines 30 to the rear wheel brake cylinders 31.

Referring to FIGURES 2 and 3 the mechanism 11 comprises a motor indicated as a whole by the numeral 35 and including a cylindrical body 36 having a forward wall 37 to which the master cylinder 25 is secured. The cylinder 36 has a rear outstanding annular flange 38 secured by bolts 39 (FIGURE 1) to an outstanding flange 40 formed on a motor head casting 41.

A rolling diaphragm 42 has a peripheral bead 43 clamped between the flanges 38 and 40. A pressure responsive unit 44 within the motor is provided with an annular flange portion 45 over which the diaphragm 42 rolls when the motor is operated, as will be understood.

The pressure responsive unit 44 has a vertical wall 50 against which the central portion of the diaphragm 42 seats, and integral with the wall 50 is a forwardly projecting cylindrical hub portion 51 in which is arranged a rear pilot stud 52 carried by the rear plunger 53 of the master cylinder 25. Such plunger displaces fluid from the rear pressure chamber 54 of the master cylinder and is connected by any suitable means to transmit force to the forward plunger (not shown) for displacing fluid to the front wheel cylinders. A reservoir 55 is adapted to supplying hydraulic fluid to the master cylinder.

Rearwardly of the pressure responsive unit 44 is arranged a sleeve 58 slidable in bearing portions 59 of the head casting 41 and sealed with respect thereto as at 60 to provide a pressure chamber 61 communicating through a port 62 with a line 63 leading in the present case to a source of superatmospheric pressure.

The forward end of the sleeve 58 is provided with a head 65 against which abuts the central portion of the diaphragm 42. Such diaphragm and the pressure responsive unit are biased to their rear limit of movement, which is their normal position, by a return spring 66. Snap rings 67 limit rearward movement of the sleeve 58 relative to the head casting 41.

Threaded within the rear end of and fixed to the sleeve 58 is a coaxial sleeve 70 the rear end of which is provided with an internal annular recess 71 having forwardly and inwardly curved forward extremity for a purpose to be described. Within the sleeve 70 is mounted for axial movement another coaxial sleeve 72 the forward end of which is annularly flanged as at 73 and sealed with respect to the inner surface of the sleeve 70. The flange 73 engages the forward end of the sleeve 70 to limit rearward movement of the sleeve 72 under power failure conditions, as described below.

The sleeve 72 has an internal flange 75 in which is slidable a stem 76, axially drilled as at 77 to connect to the atmosphere the spaces within the forward ends of the sleeves 70 and 72, as will become apparent. The stem 76 is provided with a forward flange 80 in sealed sliding engagement with the interior of the sleeve 72 and engageable with the flange 75 to limit rearward movement of the stem 76. A spring 81 biases the stem 76 to the rearward position shown in FIGURE 2 and is normally compressed when pressure is present in the source, as described below.

A cam ring 85 is carried by the rear end of the stem 76 and is provided with an external annular cam groove 86 the forward end of which curves forwardly and radially outwardly. Within this cam groove is normally arranged a plurality of balls 87 adapted to ride over the inner surface of the sleeve 70. These balls, when no pressure is present in the source, are urged outwardly into the grooves 71 as shown in FIGURE 2. The groove 86 may be annular, or there may be a series of circumferentially spaced grooves of the cross sectional shape shown with one ball 87 arranged in each groove.

As previously stated, the spring 81 is normally compressed as shown in FIGURE 3, and in the normal positions of the parts the flange 80 has its rear extremity spaced from the forward end of the internal flange 75 as shown in FIGURE 3. The space between the flanges 75 and 80 is indicated by the numeral 90 in FIGURE 3 and such space communicates through a port 91 with a chamber 92 formed between the sleeves 58 and 72, rearwardly of the flange 73. The chamber 92 communicates through a port 94 with the annular pressure chamber 61.

The pedal push rod 20 (FIGURES 2 and 3) is connected as at 96 with a head 97 slidable in the rear end of the sleeve 72. Such sleeve is provided with a shoulder 98 from which the forward end of the slidable member 97 is normally spaced (FIGURE 3) to provide loss motion 99 within the limits of which the rod 20 is movable for the operation of the valve mechanism to be described without transmitting movement to the sleeve 72 or any of the elements associated therewith.

The valve operating element 14 is slidable in an annular projection 102 formed on the valve housing 13 and is freely movable against the negligible resistance offered by a soft felt or other dust seal 103 (FIGURE 2). The portion of the valve housing 13 carrying the projection 102 formed as a cap 104 fixed to the body of the valve housing as at 104', and a diaphragm 105 is secured between the body of the housing 13 and the cap 104. The inner periphery of the diaphragm 105 is secured between the inner extremity of the valve operating element 14 and a head 106 carried thereby. The diaphragm 105 divides the valve housing to form chambers 108 and 109 the former of which communicates through a passage 110 with the motor pressure chamber 111.

A two-part valve body 113 carries a valve 114, normally open and engageable with the head 106 upon movement thereof. The valve body further includes a normally closed pressure valve 115 engageable with the vertical wall of a block 116 arranged in the chamber 108. A spring 117 biases the head 106 to its normal off position, and a spring 118 biases the valve body to its normal position shown in FIGURE 2 with the valve 115 engaging the block 116.

Forward movement of the intermediate portion of the diaphragm 105 is limited by the rear portion of the block 116, this block being notched as at 120 to afford communication between the chamber 108 and an axial passage 122 formed through the valve body. This passage communicates as at 123 with an air cleaner 124, shaped as shown in FIGURE 2, extending across an opening 125 leading into the atmospheric chamber 126 of the motor 135.

To the left of the pressure valve 115 is formed a chamber 128 communicating through a passage 129 with the annular pressure chamber 61. Pressure is always present in the chamber 128 therefor ready to be admitted past the valve 115, when the latter is opened, and into the chamber 108 and thence into the motor chamber 111.

The diaphragm 105 is backed up by a ferrule 130, and a spring 131 beyond this ferrule biases the diaphragm 105 into engagement with the block 116.

Inasmuch as the present mechanism is wholly power operated with very slight pedal movement, it may be desirable to provide some means whereby progressive wearing of the brake bands may be determined. To this end, a gage rod 135 may be fixed as shown to the body of the pressure responsive unit 44 to project forwardly through an opening 136 in the head 37. The wearing of the brake bands may be determined by how far the rod 135 projects forwardly of the head 137 when the brakes are applied.

*Operation*

In FIGURE 2 the parts have been shown in the normal or off-brake positions when no power is present for operating the motor. In FIGURE 3 the normal off-brake positions are shown when pressure is present in the source. Assuming that such pressure is present, there will be pressure in the space 90 between the flange 80 and flange 75. This pressure exerts forward force on the flange 80 and rearward force on the flange 75, maintaining the latter seated against the cam ring 85 which cannot move rearwardly because of its associated snap ring. Forward and rear pressures acting on the flanges 80 and 75 accordingly are substantially counterbalanced. However, pressure from the source flows through the port 91 into the chamber 92. Since the sleeve 70 is fixed to the sleeve 58, pressure in the chamber 92 acts forwardly against the flange 73, thus maintaining this flange against the forward wall 65 of the sleeve 58, as shown in FIGURE 3. Pressure in the chamber 92 maintains the flange 73 at its forward limit of movement as determined by the ring 75 and cam ring 85, and thus the spring 85 is maintained compressed.

Assuming that the parts occupy the position just described, pressure will be available in the chamber 92 for operating the motor 35. This pressure will be present always in the chamber 128 (FIGURE 2) but cannot normally flow past this chamber since the pressure valve 115 is seated. The atmospheric valve 114, being open, the motor chamber 111 will be vented to the atmosphere through passage 110, chamber 108, passage 122 and port 123.

Assuming that the brake is now to be operated, the pedal 17 will be depressed from the position shown in FIGURE 3. Since the head of the bolt 15 will be in contact with the valve operating element 14, initial movement of the brake pedal will move the head 106 into engagement with the valve 114 to close the motor chamber 111 to the atmosphere. Slight further movement of the brake pedal will transmit movement to the valve body 113 to crack the pressure valve 115, thus admitting pressure into the chamber 108 and through passage 110 into the motor chamber 111. The motor piston 44 will then move to operate the master cylinder 25 and displace fluid into the wheel cylinders.

As stated above the present mechanism is designed for full power operation of the brakes with no pedal assist from the operator. It is necesary therefore to move the valve operating element only to the extent referred to above, namely, to close the valve 114 and open the valve 115. This movement takes place wholly within the limits of the lost motion space 99 (FIG. 3). Therefore, full brake application takes place, when power is present, with no contact between the pedal operable member 97 and the shoulder 98.

Immediately upon initial operation of the brake pedal to crack the valve 115, pressure acting to the right against the left-hand face of the head 106 resists movement of the brake pedal to some extent thus providing an initial stage of pedal reaction. As soon as pressure admitted to the motor is sufficient to overcome the spring 131 (FIGURE 2) the diaphragm 105 will move to the right and the ferrule 130 will take up the play between its inner flange and the valve operating element 14, thus providing a second stage of pedal reaction which combines with the reaction acting against the head 106. Such reaction will be proportional to motor energization and will apprise the operator of the degree of brake application. When the brakes have been applied to the extent desired, the operator may back off very slightly on the brake pedal to allow the pressure valve 115 to close, thus placing the valves in lap position. If it is desired to ease up on the brakes, the pedal will be further slightly released to crack the atmospheric valve 114 to bleed some of the pressure from the motor chamber 111. The valve mechanism per se forms no part of the present invention, except in the combination claimed.

The superatmospheric pressure in the source is ample for maximum application of the brakes, thus making it unnecessary for the operator to assist in applying the brakes. The operator can readily control the maximum desired brake application by movement of the brake pedal as will be apparent above. Throughout the application of the brakes, pressure in the space 90 and chamber 92 will maintain the spring 81 compressed, and brake application accordingly will be controlled solely by the controlling of the valve mechanism as described.

Obviously it is desirable to provide for the pedal application of the brakes in the event of a failure of power in the source. This is possible in present booster brake mechanisms, but the pedal leverage available for the pedal application of the brakes is the same as when power is present in such constructions. Therefore it requires considerable force with such systems to apply the brakes by pedal pressure. In the copending application referred to above, there is disclosed and claimed a mechanism by which the off-brake position of the pedal is raised if the power fails and in which the operator is provided with increased leverage for the pedal-application of the brakes comparable to that provided in conventional pedal-operated systems. In the structure of the pending application there is disclosed means carried by the brake pedal for accomplishing such results.

In the present construction, the means for changing the pedal leverage and for raising it to a higher off-brake position is arranged substantially within the motor mechanism and coaxial therewith. Moreover, unlike the structure of the pending application referred to, the present mechanism takes into account the remote possibility that the pressure in the source might fail after the operator has initially moved the brake pedal from its normal off-brake position. In such case the structure of the pending application will not function to change the lever ratio.

Referring to FIGURE 3, it will be noted that under normal operating conditions the spring 81 remains compressed under all conditions so long as pressure is present in the source. Assuming that a failure in source pressure occurs, pressure will drop in the space 90 and chamber 92. When such pressure drops, the spring 81 will expand when the force on the flange 80 is less than the spring force, moving the flange 80 toward engagement with the flange 75. Movement of the flange 80 will also impart movement to the cam ring 85. This will tend to force the balls 87 against the walls of the sleeve 70. As the balls 87 cannot move out, the force will be directed against the right hand side of the ball guide holes in the sleeve 72, tending to move the sleeve 72 to the right. The drop in pressure in the chamber 92 relieves the pressure against the flange 73. Accordingly, when the flange 80 begins to move, continued expansion of the spring 81 transmits force through the flange 80, cam ring 85, and balls 87 to the sleeve 72 to move this sleeve rearwardly.

Rearward movement of the sleeve 72 accomplishes two results. In the first place, it takes up the lost motion play 99 (FIGURE 3) and thus transmits movement through the push rod 20 to move the brake pedal 17 to the solid line position shown in FIGURE 1. When the flange 73 engages the sleeve 70 the continued spring force on the flange 80 will move it into engagement with the flange 75. During this same movement the cam ring 85 will urge the balls outwardly into the groove 71 with the parts now occupying the positions shown in FIGURE 2. The high point of the cam ring 85 will now lie radially inwardly of the balls 87 to lock them in the operative position shown in FIGURE 2.

If the operator now depresses the brake pedal 17, force will be applied from the member 97 through the shoulder 98 (FIGURE 2), through the balls 87 to the sleeves 70 and 58, and thus to the motor piston 44 through the central portion of the diaphragm 42. Thus the operator is free to apply the brakes by pedal pressure, the force being applied from the pivot point 20' and the lever ratio will be approximately 5.5:1, comparable to conventional leverage ratios in pedal operable brake systems. Thus when the power fails, no more force is required for the operation of the brake pedal than is necessary in conventional pedal operable systems without power. From the high pedal position shown in solid lines in FIGURE 1, it will be obvious that the head 15 is free to move a long distance relative to the valve mechanism 14, and these elements do not come into contact under full brake operation by pedal pressure.

The parts are automatically restored to the normal pressure operable positions immediately upon the restoration of pressure in the source. When pressure is restored, it will move the flange 80 to compress the spring 81. Force is applied to the spring by the flange 80 which is moved forwardly by the pressure in the chamber 90. This movement is imparted to the cam ring 85 through its snap ring and when the grooves 86 move to positions within the balls 87, these balls are free to move radially inwardly and such movement is accomplished by movement to the left of the sleeve 72. This sleeve is accordingly free to move forwardly after the balls are released, and the cam ring 85 engages the flange 75. Pressure in the chamber 92 against the flange 73 imparts a force to move the sleeve 72 forwardly carrying with it the flange 80, cam ring 85 and balls 87, and compressing the spring 81 until the sleeve 72 contacts the head 65. Thus the parts are automatically returned to their normal positions when pressure in the source is restored.

Assuming that a power failure should occur after the operator has started to move the brake pedal from the broken line position in FIGURE 1 it will be apparent that the pedal cannot be moved to its high no-power position, assuming that the operator is exerting substantial pressure on the brake pedal. Under such conditions, the failure of the power will allow the spring 81 to move the member 76 and cam ring 85 to the right forcing the balls against the sleeve 70 and the right hand surface of the ball guide holes in the sleeve 72. The force of the spring 81 will then move the sleeve 72 until the lost motion space 99 is taken up. Therefore, even with the pedal depressed, the operator will transmit force from the member 97 to the shoulder 98, through sleeve 72, balls 87, cam ring 85, member 76 and flange 80 to the spring 81. Thus by preventing further rearward movement of the rear end of the spring 81, this spring, which is relatively strong, is caused to expend its force against the pressure responsive member 44 and thus apply the brakes. The lever ratio will be the same as for a pedal operation of the brakes as described above, the difference lying in the fact that force is transmitted to the master cylinder plunger through the spring 81.

From the foregoing it will be apparent that the present mechanism provides means wholly disassociated from the brake pedal for controlling the position of the pedal for either the power operation of the brakes with very little pedal movement, or for the pedal operation of the brakes, upon a power failure, with a substantial lever ratio to facilitate the brake operation. It also will be apparent if the power should fail while the operator is applying the brakes, pedal operation with a relatively high lever ratio is still provided.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a pressure responsive unit having a pressure chamber at one side thereof, a member to be operated connected to said pressure responsive unit, a valve mechanism connected between said pressure chamber and a source of pressure and operable for supplying fluid pressure to said pressure chamber to move said pressure responsive unit, a pedal having a normal position engaging said valve mechanism and movable from such position to operate said valve mechanism, and pedal control means wholly arranged between said pedal and said pressure responsive unit and normally free of said pedal to provide for free movement of said pedal to operate said valve mechanism, said pedal control means comprising normally inoperative force generating means operable for establishing mechanical connection between said pressure responsive unit and said pedal, and means subject to a failure in pressure in said source for releasing said force generating means.

2. A fluid pressure motor mechanism comprising a pressure responsive unit having a pressure chamber at one side thereof, a member to be operated connected to said pressure responsive unit, a valve mechanism connected between said pressure chamber and a source of pressure and operable for supplying fluid pressure to said pressure chamber to move said pressure responsive unit, a pedal having a normal position engaging said valve mechanism and movable from such position to operate said valve mechanism, and pedal control means wholly arranged between said pedal and said pressure responsive unit and normally free of said pedal to provide for free movement of said pedal to operate said valve mechanism, said pedal control means comprising a source of stored energy releasable for establishing mechanical connection between said pressure responsive unit and said pedal, and means subject to operation by a failure of pressure in said source of pressure for releasing said source of stored energy.

3. A fluid pressure motor mechanism comprising a pressure responsive unit having a pressure chamber at one side thereof, a member to be operated connected to said pressure responsive unit, a valve mechanism connected between said pressure chamber and a source of pressure and operable for supplying fluid pressure to said pressure chamber to move said pressure responsive unit, a pedal having a normal position engaging said valve mechanism and movable from such position to operate said valve mechanism, and pedal control means wholly arranged between said pedal and said pressure responsive unit and normally free of said pedal to provide for free movement of said pedal to operate said valve mechanism, said pedal control means comprising a spring having operative connection at one end with said pressure responsive unit, force transmitting means interposed between the other end of said spring and said pedal and normally free of the latter, and means subject to pressure in said source for normally maintaining said spring compressed whereby, when pressure in said source fails, said spring will expand to move said force transmitting means into engagement with said pedal and establish mechanical connection between said pedal and said pressure responsive unit.

4. A fluid pressure motor mechanism comprising a pressure responsive unit having a pressure chamber at one side thereof, a member to be operated connected to said pressure responsive unit, a valve mechanism connected between said pressure chamber and a source of pressure and operable for supplying fluid pressure to said pressure chamber to move said pressure responsive unit, a pedal having a normal position engaging said valve mechanism and movable from such position to operate said valve mechanism, and pedal control means wholly arranged between said pedal and said pressure responsive unit and normally free of said pedal to provide for free movement of said pedal to operate said valve mechanism, said pedal control means comprising a source of stored energy, force transmitting means between said source of stored energy and said pedal and normally free of the latter, and means subject to pressure in said source of pressure for maintaining said source of stored energy inoperative whereby, upon a failure of pressure in said source, said force transmitting means will be moved by said source of stored energy into engagement with said pedal to transmit force to said pressure responsive unit.

5. A fluid pressure motor mechanism comprising a pressure responsive unit having a pressure chamber at one side thereof, a member to be operated connected to said pressure responsive unit, a valve mechanism connected between said pressure chamber and a source of pressure and operable for supplying fluid pressure to said pressure chamber to move said pressure responsive unit, a pedal having a normal position engaging said valve mechanism and movable from such position to operate said valve mechanism, and pedal control means wholly arranged between said pedal and said pressure responsive unit and normally free of said pedal to provide for free movement of said pedal to operate said valve mechanism, said pedal control means comprising a source of stored energy, force transmitting means between said source of stored energy and said pedal and normally free of the latter, means subject pressure in said source of pressure for maintaining said source of stored energy inoperative whereby, upon a failure of pressure in said source, said force transmitting means will be moved by said source of stored energy into engagement with said pedal to transmit force to said pressure responsive unit, and means operative upon movement of said pedal by said force transmitting means to a pre-determined position relative to said pressure responsive unit for establishing positive mechanical connection between such unit and said pedal.

6. A mechanism according to claim 5 wherein said source of stored energy comprises a spring, said force transmitting means having a surface subject to pressure in said source of pressure for normally maintaining said spring compressed.

7. A fluid pressure motor mechanism comprising a pressure responsive unit having a pressure chamber at one side thereof, a member to be operated connected to said pressure responsive unit, a valve mechanism connected between said pressure chamber and a source of pressure and operable for supplying fluid pressure to said pressure chamber to move said pressure responsive unit, a pedal having two normal positions in one of which it engages said valve mechanism and from which position it is movable to operate said valve mechanism, and pedal control means arranged wholly between said pedal and said pressure responsive unit and normally free of said pedal when the latter is in said one normal position for free movement of said pedal to operate said valve mechanism, said pedal control means being arranged coaxial with said pressure responsive unit and comprising normally relatively axially movable members comprising a force transmitting means, a source of stored energy interposed between said pressure responsive unit and said force transmitting means, said force transmitting means having a portion subject to pressure in said source of pressure for maintaining said source of stored energy inoperative whereby, when pressure in said source fails, said source of stored energy exerts a force to effect relative axial movement between said relatively movable members and to move said pedal away from said valve mechanism to the other normal position and establish mechanical connection between said force transmitting means and said pedal whereby, when said pedal is moved from said second normal position, it will operate said force transmitting means to transmit force to said pressure responsive unit.

8. A mechanism according to claim 7 wherein said source of stored energy is a compressed coil spring coaxial with said pressure responsive unit.

9. A mechanism according to claim 7 wherein one of said relatively movable members directly engages said pressure responsive unit, and means operative when said pedal is moved to said other normal position for effecting a positive mechanical connection between said pedal and said one relatively movable member to directly transmit forces from said pedal to said pressure responsive unit.

10. A mechanism according to claim 7 wherein one of said axially movable members directly engages said pressure responsive unit, said source of stored energy being a normally compressed spring engaging between said one axially movable member and the other axially movable member, said other axially movable member, when moved by said spring incident to a failure in pressure in said source, engaging said pedal to move it to said second normal position for the direct operation of said pressure responsive unit by said pedal.

11. A mechanism according to claim 10 provided with means operable when said relatively movable members move a predetermined distance relative to each other and said pedal reaches said other normal position for positively locking said relatively movable members to each other for the direct transmission of force from said pedal through said relatively movable members to said pressure responsive unit.

12. A mechanism according to claim 10 wherein said other relatively movable member comprises a plurality of elements movable relative to each other and comprising in part a cam ring, and means for establishing positive connection between said cam ring and said one relatively movable member when said relatively movable members move a predetermined distance relative to each other and said pedal reaches said second normal position for establishing a positive connection between said relatively movable members for the direct operation of said pressure responsive unit by said pedal through said relatively movable members.

13. A fluid pressure motor mechanism comprising a pressure responsive unit having a pressure chamber at one side thereof, a member to be operated connected to said pressure responsive unit, a valve mechanism connected between said pressure chamber and a source of fluid pressure and operable for supplying pressure to said pressure chamber to move said pressure responsive unit, a pedal having two normal positions in one of which it engages said valve mechanism and from which position it is movable to operate said valve mechanism, and pedal control means arranged between said pedal and said pressure responsive unit coaxial with the latter, such means comprising two normally relatively axially movable units one of which directly engages said pressure responsive unit, the other relatively movable unit comprising a plurality of axially relatively movable elements, a spring arranged between one of said elements and said pressure responsive unit, a second of said elements having a first pressure surface subject to pressure in said source to maintain it at a limit of movement in the direction of said pressure responsive unit, said one element having a pressure surface exposed to pressure in said source and cooperating with said first surface and with others of said elements to normally hold said spring compressed when pressure is present in said source, said pedal in said one normal position having lost motion connection with said other relatively movable unit and which is adapted to be taken up whereby said other relatively movable unit moves said pedal to its other normal position upon a failure of pressure in said source which allows said spring to expand, said pressure surface of said one element engaging a surface of said second element when said spring expands, to move said pedal to said other normal position spaced from said valve mechanism and from which position said pedal is movable to transmit force to said pressure responsive unit.

14. A mechanism according to claim 13 provided with means interengageable between said relatively movable units to establish a mechanical connection therebetween for the pedal operation of said pressure responsive unit by said pedal when the latter is in said other normal position.

15. A mechanism according to claim 13 wherein another of said elements is a cam, and means movable by said cam when said pedal reaches said other normal position for locking said relatively movable units together for the direct operation therethrough of said pressure responsive unit by said pedal.

References Cited in the file of this patent

UNITED STATES PATENTS

| | | |
|---|---|---|
| 2,706,020 | Freers et al. | Apr. 12, 1955 |
| 2,755,891 | Levell et al. | July 24, 1956 |
| 2,766,732 | Schultz | Oct. 16, 1956 |
| 2,910,147 | Fishtahler et al. | Oct. 27, 1959 |
| 2,959,011 | Randol | Nov. 8, 1960 |
| 2,976,849 | Stelzer | Mar. 28, 1961 |
| 2,980,066 | Stelzer et al. | Apr. 18, 1961 |
| 2,985,147 | Rockwell | May 23, 1961 |